US012682645B2

(12) United States Patent  
Matsumoto et al.

(10) Patent No.: US 12,682,645 B2  
(45) Date of Patent: Jul. 14, 2026

(54) ANALYSIS DEVICE, ANALYSIS SYSTEM, ANALYSIS METHOD, AND COMPUTER-READABLE MEDIUM

(71) Applicants: Preferred Networks, Inc., Tokyo (JP); Ito-Yokado Co., Ltd., Tokyo (JP)

(72) Inventors: Eiichi Matsumoto, Tokyo (JP); Shunta Saito, Tokyo (JP); Daisuke Nishino, Tokyo (JP); Yoshihiro Yamada, Tokyo (JP); Yoshifumi Maruyama, Tokyo (JP); Yuichi Nonome, Tokyo (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

(21) Appl. No.: 18/449,925

(22) Filed: Aug. 15, 2023

(65) Prior Publication Data

US 2024/0037952 A1 Feb. 1, 2024

Related U.S. Application Data

(63) Continuation of application No. PCT/JP2022/005401, filed on Feb. 10, 2022.

(30) Foreign Application Priority Data

Feb. 17, 2021 (JP) ................................. 2021-023664

(51) Int. Cl.
        *G06V 20/52* (2022.01)
        *G06T 5/50* (2006.01)
        (Continued)

(52) U.S. Cl.
        CPC .............. *G06V 20/52* (2022.01); *G06T 5/50* (2013.01); *G06T 7/70* (2017.01); *G06V 10/25* (2022.01);
        (Continued)

(58) Field of Classification Search
        CPC ...... G06V 20/52; G06V 10/25; G06V 10/255; G06T 5/50; G06T 7/70; G06T 2207/20221; G06T 2207/30242
        See application file for complete search history.

(56) References Cited

U.S. PATENT DOCUMENTS

2016/0300181 A1    10/2016    Iwai et al.
2016/0379159 A1    12/2016    Yasunaga
                   (Continued)

FOREIGN PATENT DOCUMENTS

JP        2015-103153        6/2015
JP        2015-210723        11/2015
                   (Continued)

OTHER PUBLICATIONS

Cyberlinks Co.,Ltd., "Shelf SCAN-AI AI Shelf Allocation Image Recognition Service" <URL: https://cyberlinks-portal.com/service/tanascan-ai/?_fsi=c8e8Tmyu>, Retrieved on Nov. 30, 2020 with machine translation.
                   (Continued)

*Primary Examiner* — Nasim N Nirjhar  
(74) *Attorney, Agent, or Firm* — IPUSA, PLLC

(57) ABSTRACT

One aspect of the present disclosure relates to an analysis device including one or more memories and one or more processors. The one or more processors are configured to estimate an arrangement region of a group of products of a same type based on a sales floor image, and notify information on a display state of the group of products in the arrangement region estimated.

31 Claims, 8 Drawing Sheets

(51) Int. Cl.
  *G06T 7/70* (2017.01)
  *G06V 10/25* (2022.01)
(52) U.S. Cl.
  CPC .............. *G06T 2207/20221* (2013.01); *G06T 2207/30242* (2013.01)

(56) References Cited

U.S. PATENT DOCUMENTS

| 2017/0255899 A1 | 9/2017 | Taira et al. | |
|---|---|---|---|
| 2018/0122062 A1 | 5/2018 | Takenaka et al. | |
| 2019/0156261 A1 | 5/2019 | Nishino et al. | |
| 2020/0005225 A1 | 1/2020 | Chaubard | |
| 2020/0013169 A1 | 1/2020 | Higa | |
| 2020/0334620 A1 | 10/2020 | Yanagi et al. | |
| 2021/0027485 A1* | 1/2021 | Zhang | G06T 7/11 |
| 2022/0083803 A1* | 3/2022 | Subramanian | G06N 20/00 |
| 2022/0092664 A1* | 3/2022 | Glaser | G06N 3/08 |

FOREIGN PATENT DOCUMENTS

| JP | 6008339 | 10/2016 |
|---|---|---|
| JP | 2017-007861 | 1/2017 |
| JP | 2017-157032 | 9/2017 |
| JP | 2017-182653 | 10/2017 |
| JP | 2018-010372 | 1/2018 |
| JP | 6695539 | 5/2020 |
| JP | 2020-113042 | 7/2020 |
| JP | 2021-000687 | 1/2021 |
| WO | 2018/179361 | 10/2018 |
| WO | 2019/087519 | 5/2019 |

OTHER PUBLICATIONS

Yoji Kozaki, "1500 AI Cameras and 200 Smart Regicarts, Smart Store TRIAL Aims to Become an Unmanned Store Benefits of Industry-University Collaboration epiST Summit 2019 Fall" <URL: https://robotstart.info/2019/10/19/epist-summit2019-02.html>, Retrieved on Nov. 30, 2020 with machine translation.
Brian Heater "How Bossa Nova's robots track inventory at Walmart stores", Apr. 11, 2019, <URL: https://www.youtube.com/watch?v=SXEaCZ4KzL8>.
Panasonic Solution Japan 2019, "Stock Shortage Detecting System", Jul. 10, 2019.

* cited by examiner

IMAGE FROM WHICH MOVING OBJECTS ARE REMOVED

PRODUCT REGION MAP

PRODUCT CENTER HEATMAP

PRODUCT ORIENTATION HEATMAP

ROUND MARK: PEAK-DETECTED PRODUCT CENTER

STRAIGHT LINE: PRODUCT ORIENTATION AT CENTER OF EACH PRODUCT

REGION ENCLOSED BY CURVED LINE: PREDICTED ARRANGEMENT REGION AND PRODUCT NAME

START

S101
OBTAIN SALES FLOOR IMAGE

S102
ESTIMATE ARRANGEMENT REGION OF GROUP OF PRODUCTS

S103
ESTIMATE DISPLAY STATE OF ARRANGEMENT REGION

S104
DOES DISPLAY STATE SATISFY PREDETERMINED CONDITION?

NO

YES

S105
NOTIFY DISPLAY STATE

END

FIG.8

ANALYSIS DEVICE, ANALYSIS SYSTEM, ANALYSIS METHOD, AND COMPUTER-READABLE MEDIUM

CROSS-REFERENCE TO RELATED APPLICATIONS

The present application is a continuation application of International Application No. PCT/JP2022/005401, filed Feb. 10, 2022, which claims priority to Japanese Patent Application No. 2021-023664, filed Feb. 17, 2021. The contents of these applications are incorporated herein by reference in their entirety.

TECHNICAL FIELD

The present disclosure relates to an analysis device, an analysis system, an analysis method, and a computer-readable medium.

BACKGROUND ART

Use of information technology has been active in the retail industry, such as in supermarkets and in convenience stores. For example, information technology is being used for display of products in stores.

SUMMARY

One aspect of the present disclosure relates to an analysis device including one or more memories and one or more processors. The one or more processors estimate an arrangement region of a group of products of the same type, and estimate a display state of the group of products in the arrangement region.

BRIEF DESCRIPTION OF DRAWINGS

FIG. 8 is a block diagram illustrating a hardware configuration of the analysis device according to one example of the present disclosure.

DESCRIPTION OF EMBODIMENTS

In the following, the present disclosure will be described with reference to the drawings.

The following examples disclose an analysis system that takes a sales floor image of a store and estimates a display state of products based on the sales floor image using a machine learning model.

[Analysis System]

Figure 1:
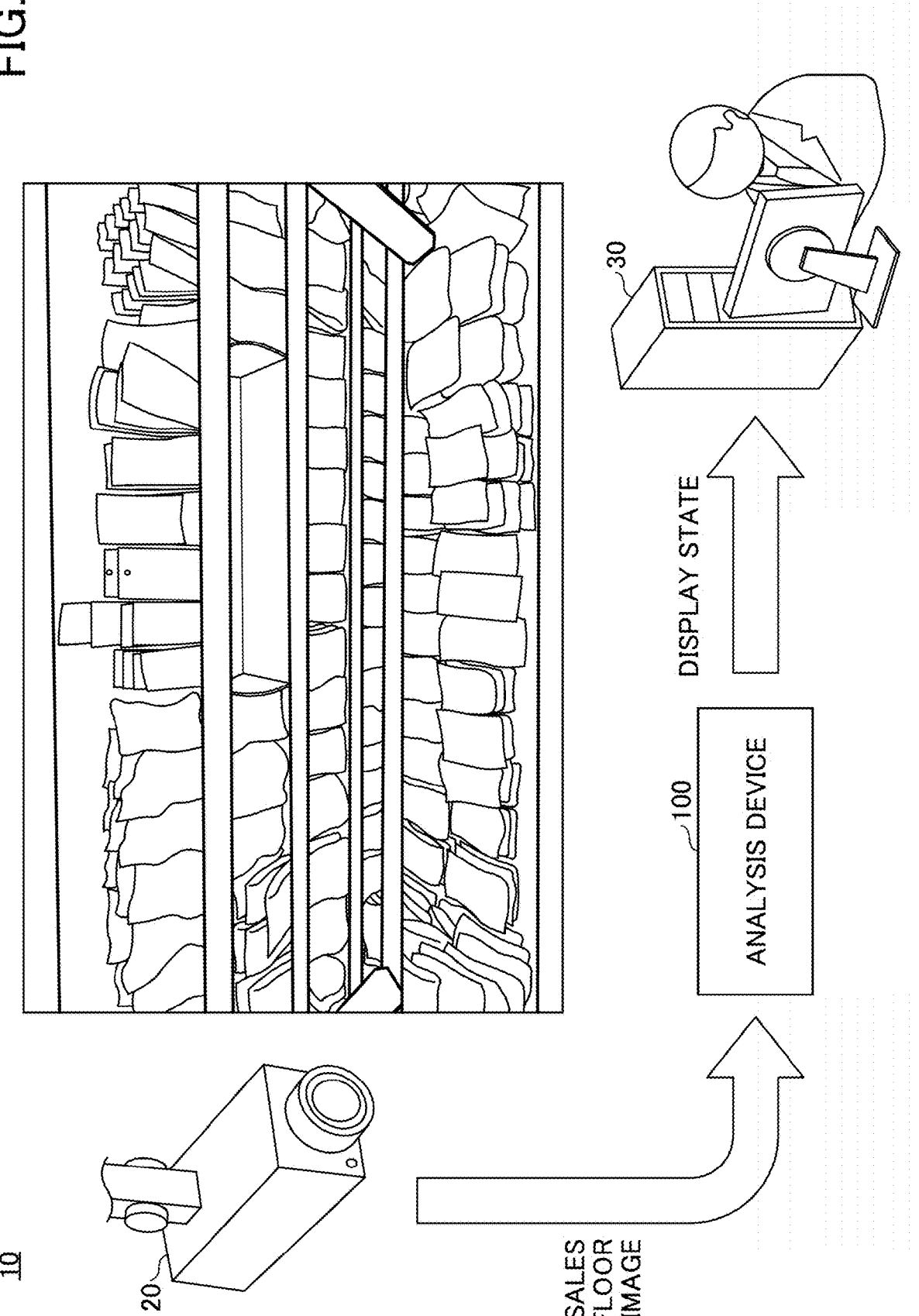
FIG. 1 is a schematic view illustrating an analysis system according to one example of the present disclosure.

First, referring to FIG. 1, an analysis system according to one example of the present disclosure will be described. FIG. 1 is a schematic view illustrating the analysis system according to one example of the present disclosure.

As illustrated in FIG. 1, an analysis system 10 includes an image-taking device 20, a user terminal 30, and an analysis device 100. In response to obtaining a sales floor image from the image-taking device 20, the analysis device 100 analyzes the obtained sales floor image and notifies the user terminal 30 of, for example, a display state of the sales floor whose image has been taken, instructions for the display state, and instructions in relation to the display state. The display state may be, for example, the product name for each of the types of products, the number of products, or the alignment degree of products, displayed in an arrangement region of the sales floor.

The image-taking device 20 may be, for example, a video camera disposed in stores and the like, and takes an image of a sales floor that is an image-taking target, and transmits the sales floor image to the analysis device 100. Typically, the image-taking device 20 is disposed near the sales floor whose image is to be taken, and is used for observing the sales floor. The image-taking device 20 may be fixed to a certain place of the store, or may be a portable one attached to a robot or a cart. Thereby, it is possible to obtain various information. Also, it is possible to reduce the number of image-taking devices 20 to be set. Also, multiple image-taking devices 20 may be provided. Thereby, even if a blind spot or the like occurs, it is possible to obtain an appropriate sales floor image.

The user terminal 30 may be, for example, an information processing device such as a personal computer, a tablet, or a smartphone that is provided in, for example, a store. The user terminal 30 obtains information in relation to display states of various groups of products in a sales floor, which are estimated based on the sales floor image, from the analysis device 100 or from a server or the like that stores analysis results of the analysis device 100. For example, the user terminal 30 may include software in relation to the running of business or improvement of business operations of the store, e.g., various software for assisting a store clerk or the like in, for example, replenishment, replacement, and pricing of the products. Also, the user terminal 30 may include software that enables the analysis results of the analysis device 100 to be viewed. The store clerk or the like may perform replenishment, replacement, pricing, and the like of the products of the sales floor based on data analyzed by the various software using, for example, the display states and POS (Point Of Sales) data that have been obtained from the analysis device 100.

The analysis device 100 may be, for example, an information processing device such as a personal computer provided in the store, or a server provided in a place different from the store, e.g., in the main office managing the store or on the cloud. From the sales floor image obtained from the image-taking device 20, the analysis device 100 estimates an arrangement region for each of the types of products displayed in the sales floor, and estimates a display state of the group of products disposed in the arrangement region. Note that, the analysis device 100 may obtain the sales floor image obtained from the image-taking device 20, or may obtain data that have been obtained by subjecting the sales floor image to a predetermined process. In such a case, the sales floor image obtained from the image-taking device 20 is output to a predetermined processing device, and data that have been processed in the processing device are output to the analysis device 100. Thereby, it is possible to readily transmit information in relation to the sales floor image via a network, and readily perform subsequent processes in the analysis device 100. When multiple image-taking devices 20 are disposed, the processing device to be provided may be one for the multiple image-taking devices 20.

Figure 2:
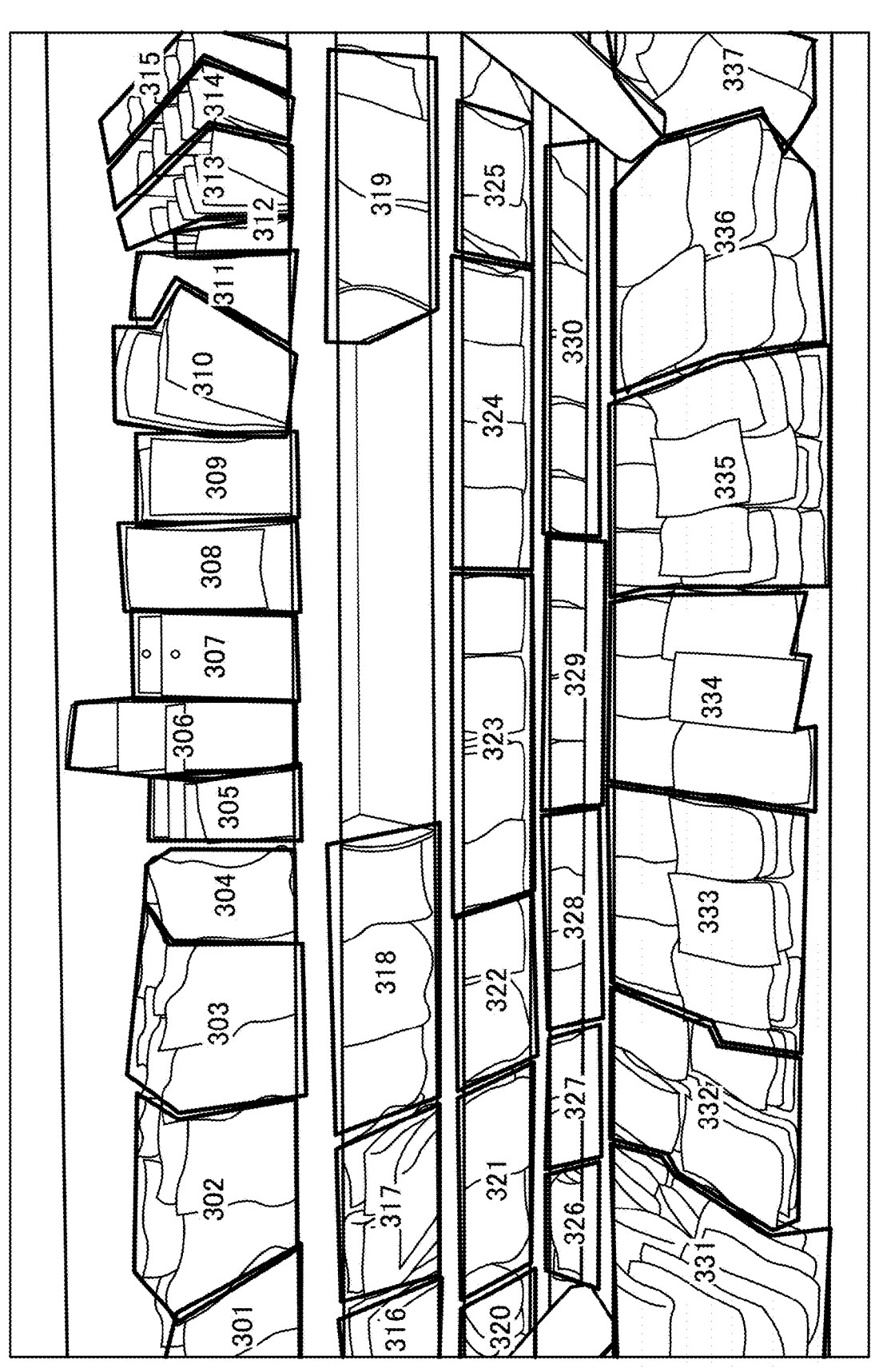
FIG. 2 is a view illustrating segmentation according to one example of the present disclosure.

Here, the display state refers to a display state of the group of the products, e.g., the product name of the group of products, the number of products, or the alignment degree of products, displayed in the arrangement region. The analysis device 100 according to the present example may utilize a machine learning model such as a neural network, and estimate an arrangement region for each of the types of products from the sales floor image and estimate a display state of a group of products of the same type displayed in the arrangement region. For example, the analysis device 100 performs segmentation of a frame of the sales floor image as illustrated in FIG. 1 for each of the types of products, thereby obtaining a segmented frame as illustrated in FIG. 2. Here, the analysis device 100 may subject the sales floor image obtained from the image-taking device 20 to a real-time process or a batch process.

Figure 3:
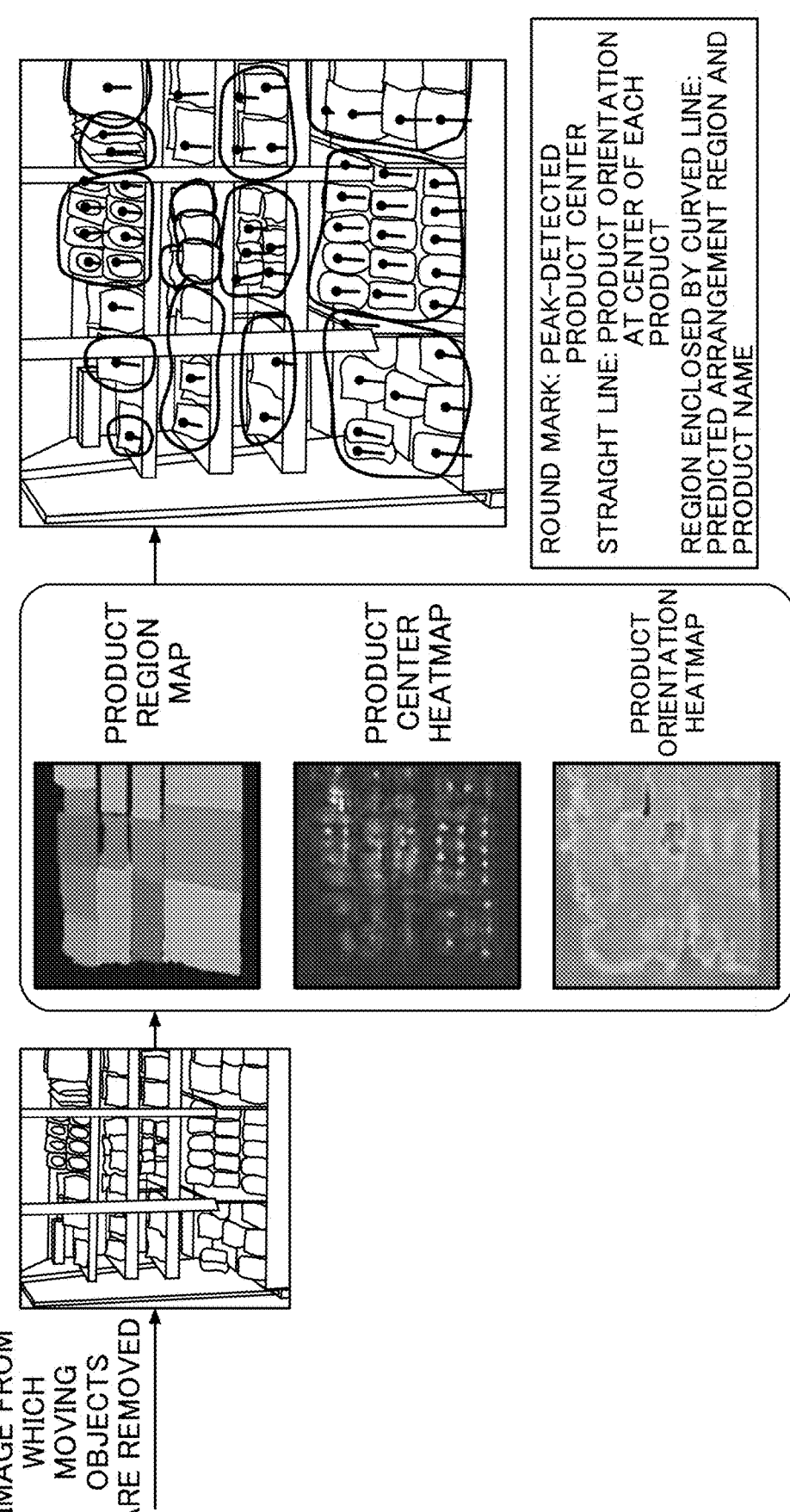
FIG. 3 is a schematic view illustrating an analysis process according to one example of the present disclosure.

In the below-described examples, as illustrated in FIG. 3, the analysis device 100 may input the sales floor image to a machine learning model and segment the sales floor image, and obtain: a product region map representing an arrangement region for each of the types of products; a product center heatmap representing the center of each of the products disposed in the sales floor; and a product orientation heatmap representing an orientation of each of the products disposed in the sales floor. When the product region map, the product center heatmap, and the product orientation heatmap have been obtained from the machine learning model, the analysis device 100 can superimpose these data on the sales floor image and confirm the display state of each of the products. Note that, the center in the present disclosure does not strictly refer to the center. Also, the center can be calculated by various methods.

According to the present disclosure, it is possible to estimate the display state of not only products stored in a regular-shaped storage container such as a box, but also products such as vegetables and fruits stored in, for example, an irregular-shaped bag or wrapping.

[Analysis Device]

Figure 4:
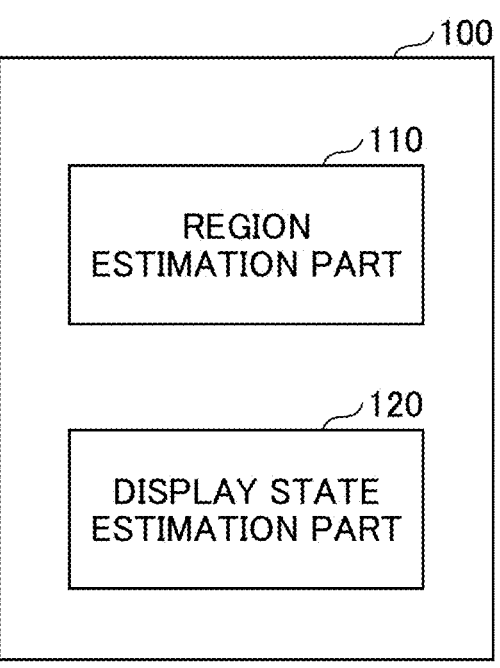
FIG. 4 is a block diagram illustrating a functional configuration of an analysis device according to one example of the present disclosure.

Next, referring to FIG. 4, the analysis device 100 according to one example of the present disclosure will be described. FIG. 4 is a block diagram illustrating a functional configuration of the analysis device 100 according to one example of the present disclosure.

As illustrated in FIG. 4, the analysis device 100 includes a region estimation part 110 and a display state estimation part 120. The region estimation part 110 and the display state estimation part 120 are installed in the analysis device 100, and are realized when one or more processors execute one or more programs stored in the one or more memories.

The region estimation part 110 estimates an arrangement region of a group of products that is to be classified as the same from the sales floor image (which is referred to as a group of products of the same type in the present specification). Specifically, in response to obtaining the sales floor image from the image-taking device 20, the region estimation part 110 performs segmentation of the frame of the sales floor image for each of the types of products, thereby estimating an arrangement region for each of the types of products. In a typical sales floor, various products are disposed together in a display shelf for each of the types of products.

For example, in the sales floor of vegetables, multiple bags in which onions produced in geographical area A are packaged (product type 1), multiple bags in which onions produced in geographical area B are packaged (product type 2), multiple bags in which onions produced in geographical area C are packaged (product type 3), and multiple bags in which onions produced in geographical area D are packaged (product type 4) are disposed together in the display shelf for each of the product types. In response to obtaining the sales floor image of vegetables, the region estimation part 110 performs, for example, removal of moving objects such as humans and shopping carts included in the sales floor image, and pre-processing such as cropping of a region of interest. In a frame of the pre-processed sales floor image, the following are estimated: an arrangement region where a group of products of the product type 1 are displayed; an arrangement region where a group of products of the product type 2 are displayed; an arrangement region where a group of products of the product type 3 are displayed; and an arrangement region where a group of products of the product type 4 are displayed.

In one example, the region estimation part 110 may use a trained machine learning model, and perform segmentation of the frame of the sales floor image based on the product type and estimate the arrangement region for each of the products types. In other words, a machine learning model may be trained, in response to input of a frame of the sales floor image, to segment the frame to output a product region map representing an arrangement region for each of the product types. For example, when the product region map has been obtained by inputting the frame of the sales floor image of vegetables as illustrated in FIG. 3 to the trained machine learning model, the region estimation part 110 may superimpose the obtained product region map on an input frame and generate a segmented frame for each of the product types.

Here, the machine learning model for region estimation may be realized as, for example, a neural network and may be trained through supervised learning using, as training data, a pair of a frame of the sales floor image as illustrated in FIG. 1 and a frame with annotations in relation to information on the arrangement region for each of the product types as illustrated in FIG. 2. Specifically, the machine learning model may be an instance segmentation model such as Mask-RCNN (Regional Convolutional Neural Network) and may be trained so as to predict a bounding box of an object to be detected and a segmentation mask corresponding thereto for multiple products or product types in a frame.

Alternatively, the machine learning model may be a convolutional neural network and may be trained so as to perform segmentation by clustering feature vectors on a feature value map. That is, a region where the feature vectors are close can be regarded as a region where products of the same type are displayed. Such a convolutional neural network may be trained by tuning a convolutional neural network that has been previously trained with another large-scale image dataset such as Imagenet, or may be trained by allocating tentative labels to product regions and so as to predict the label numbers.

When segmentation is performed for each of the frames, fluctuation in recognition is likely to occur, e.g., one region in a certain frame is divided into two in another frame. Therefore, the region estimation part 110 may treat the frames through smoothing in a temporal direction so as not to cause rapid change relative to the past prediction results. Note that, in the batch process, it is possible to use not only the past prediction results but also future prediction results. Meanwhile, in the case of replenishing or replacing the products, recognition of the rapid change may be actual. Therefore, the region estimation part 110 may allow rapid change without performing smoothing when an inter-frame difference of the sales floor image is greater than a predetermined threshold.

The display state estimation part 120 estimates the display state of the group of products in the arrangement region. For example, the display state estimation part 120 may estimate one or more of the product name of the group of products, the number of products, and the alignment degree of products, in the arrangement region. Specifically, the display state estimation part 120 uses a trained machine learning model and estimates the display state, such as the product name of the group of products, the number of products, and the alignment degree of products, for the group of products included in the arrangement region for each of the types of products estimated by the region estimation part 110. For example, in response to detecting that the number of products in a certain arrangement region on the sales floor whose image is taken is small, or the alignment degree of products is low, the display state estimation part 120 can identify the name of products in the arrangement region and notify a store clerk so as to replenish the products or align the display of the products. In one example, the display state estimation part 120 uses a trained machine learning model and may estimate, as the display state, at least one of the product name of products, the number of products, and the alignment degree of products in the arrangement region. The machine learning model is trained, in response to input of a frame of the sales floor image, to output the product name, center position, and/or orientation of the products included in the frame. For example, the product name may be indicated by product identification information (e.g., a product number or the like) that is previously allocated to the product name. Also, the center position of each product may be indicated by, for example, a symbol (e.g., a round mark or the like) indicating the center of each product in the frame, or may be indicated by, for example, the product center heatmap as illustrated in FIG. 3. Further, the orientation of each product may be indicated by, for example, a symbol (e.g., a straight line or the like) indicating the orientation of each product in the frame, or may be indicated by, for example, the product orientation heatmap as illustrated in FIG. 3. The machine learning model is trained, in response to input of a frame of the sales floor image, to output at least one of the product name of products, the center of products, and the orientation of products, taken in the frame. Such a machine learning model may be realized as, for example, a neural network and may be trained through supervised learning using, as training data, a pair of a frame of the sales floor image, and the product name for each of the types of products in the frame and a frame with annotations in relation to information on the center and/or orientation of each product.

For example, when the display state estimation part 120 uses a trained machine learning model and estimates the product name of the group of products displayed in the arrangement region, the machine learning model may identify, from an input frame, product identification information (e.g., a product number or the like) of the products taken in the frame. That is, the machine learning model may be realized as a neural network and may be trained through supervised learning using, as training data, a pair of a frame of the sales floor image and a frame with annotations in relation to product identification information of each product in the frame. When the machine learning model trained in this way has been obtained, the display state estimation part 120 can use this machine learning model and estimate the product name of each of the products displayed in the frame of the sales floor image. Here, the input frame may be a frame that is segmented by the region estimation part 110, or may be a frame that is not segmented.

Alternatively, the machine learning model may be a neural network that determines a feature value of a product for each of the product types from the frame of the sales floor image. The display state estimation part 120 may estimate a feature value of each product disposed in the frame using the machine learning model and identify, as a product of interest, the product name corresponding to the estimated feature value.

Note that, when a product does not fall in any of the existing product types, the product may be determined to be unknown. Also, when external information such as layout information and POS data of a store is available, such information may be used for estimation. For example, from the external information, it is possible to narrow down products to be disposed in a sales floor to be analyzed, obtain a machine learning model for each of the types of product classes (e.g., vegetables, sweets, or the like) suitable for products of the sales floor to be analyzed (e.g., a vegetables sales floor, a sweets sales floor, or the like), and increase estimation accuracy.

Figure 5:
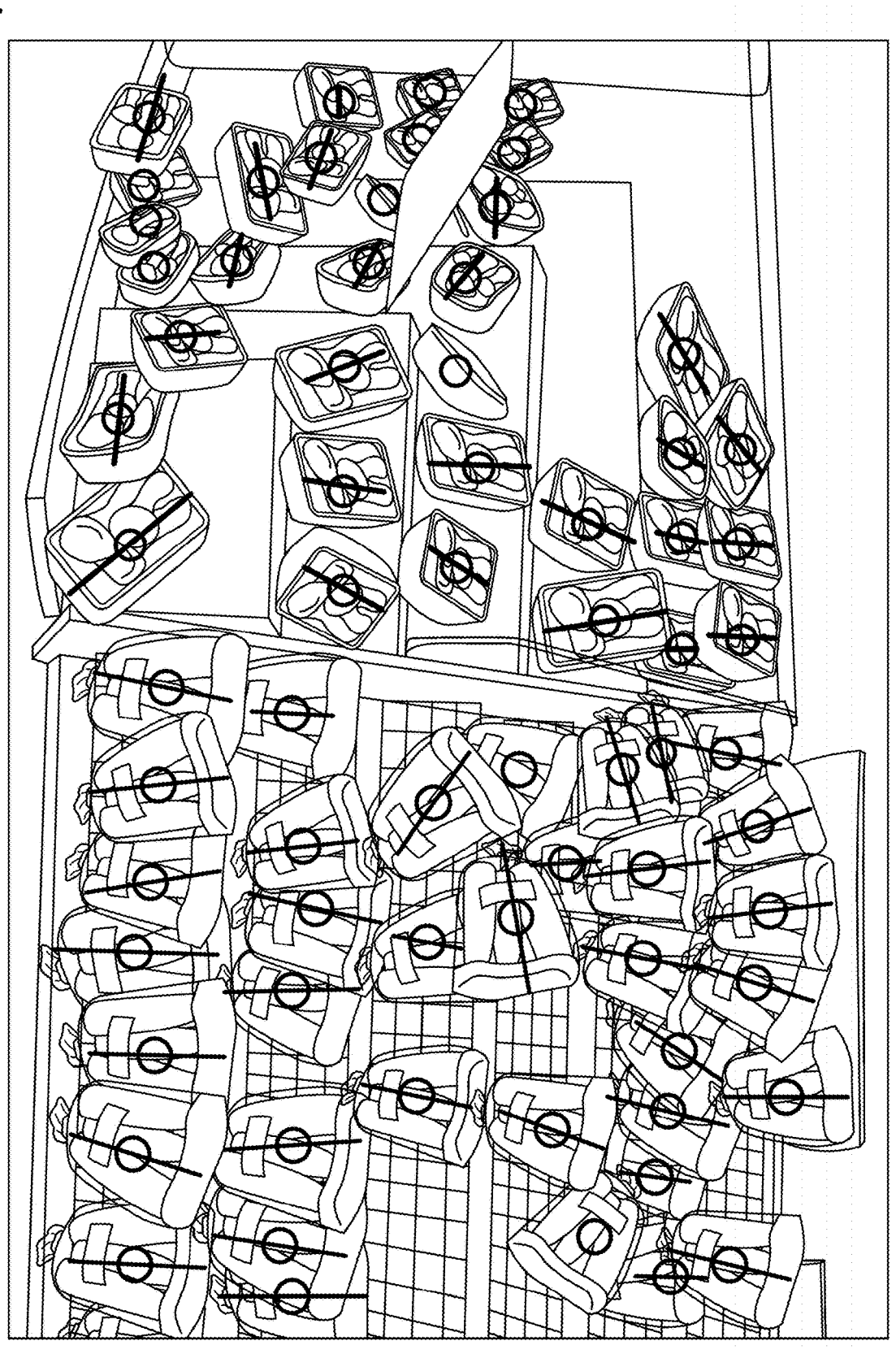
FIG. 5 is a view illustrating training data according to one example of the present disclosure.

Next, when the display state estimation part 120 estimates the number of products of the group of products in the arrangement region by using a trained machine learning model, the machine learning model may, for example, identify from an input frame, a point in a region of products taken in the frame, e.g., the center of products. That is, the machine learning model may be realized as a neural network and may be trained through supervised learning using, as training data, a pair of a frame of the sales floor image and a frame with annotations indicating the center of each product in the frame. For example, FIG. 5 is one example of a frame with annotations given the center of each product. In the illustrated frame with annotations, the round mark, which indicates the center of wrapped products, is given to each product as an annotation.

Figure 6:
FIG. 6 is a view illustrating estimation results according to one example of the present disclosure.

When the machine learning model trained in this way has been obtained, the display state estimation part 120 can use this machine learning model and estimate the center of each of the products displayed in the frame of the sales floor image. Then, referring to the frame segmented by the region estimation part 110, the display state estimation part 120 can estimate the number of products displayed in each arrangement region based on the number of estimated center points in the arrangement region. For example, using the machine learning model that identifies the product name in combination with the machine learning model that estimates the point of the center of products, the display state estimation part 120 can generate information indicating the product name of the group of products and the center of each of the products, disposed in each arrangement region of a segmented frame as illustrated in FIG. 6. By counting the number of the points (preferably the points of the center) included in each arrangement region based on the frame, the display state estimation part 120 can estimate the product name and the number of products for each of the product types. Also, the number of products may be estimated based on exposed areas in a place where products in the arrangement region are displayed (e.g., a shelf board, a fixture bottom on which products are to be displayed, or the like), i.e., based on areas from which products have been removed.

When the number of products estimated for a certain arrangement region estimated in this way is equal to or lower than a set value, a display state determination part determines that there is a need for replenishment of products in the arrangement region, and a display state instruction part may instruct a store clerk or the like to replenish products in the arrangement region.

Note that, estimation of the number of products according to the present disclosure is not limited to this, but it may be possible to use a machine learning model that performs detection based on bounding boxes indicating the position of each product in the frame, instead of the points indicating the product. In this case, the display state estimation part 120 may estimate the number of products by counting the number of bounding boxes included in each arrangement region. Alternatively, a product density may be used for estimation. For example, by regarding a heatmap of product points as the product density and integrating the product center heatmap for each arrangement region, the number of products may be estimated. Alternatively, using a machine learning model that is trained to give the number of products from a feature value of an arrangement region through regression, the display state estimation part 120 may estimate the number of products in each arrangement region of a frame. According to the estimation of the number of products through regression of the above-described product density and number of products, it is possible to predict the number of products hidden from view that were not taken in a frame if the machine learning model has been appropriately trained.

Next, when the display state estimation part 120 estimates the alignment degree of products of the group of products in the arrangement region by using a trained machine learning model, the machine learning model may, for example, identify from an input frame, an orientation of products taken in the frame. That is, the machine learning model may be realized as, for example, a neural network and may be trained through supervised learning using, as training data, a pair of a frame of the sales floor image and a frame with annotations indicating the orientation of each product in the frame. FIG. 5 is one example of a frame with annotations given information on the orientation of each product. In the illustrated frame with annotations, the straight line, which indicates the orientation of wrapped products, is given to each product as an annotation.

Using the machine learning model that has been trained in this way, the display state estimation part 120 estimates the orientation of each of the products displayed in the frame of the sales floor image. Then, referring to a frame segmented by the region estimation part 110, it is possible to estimate the alignment degree of products displayed in each arrangement region based on how even the estimated orientations in each arrangement region are. For example, using the machine learning model that estimates the center of products in combination with the machine learning model that estimates the orientation of products, the display state estimation part 120 may, first, predict the centers of products in the arrangement region and predict the orientations of the products relative to the centers of the products, and may determine how uneven the orientations of the products included in the arrangement region are. Specifically, the display state estimation part 120 may define, as the alignment degree of products, the maximum value of the differences between the orientations of the products of the group of products in the arrangement region. When the maximum value of the differences between the orientations of the products in a certain arrangement region is equal to or higher than a predetermined threshold, the display state determination part determines that there is a need for alignment in the arrangement region, and the display state instruction part may instruct a store clerk or the like via a user terminal or the like to align the products displayed in the arrangement region.

Note that, estimation of the alignment degree of products according to the present disclosure is not limited to this, but a feature value may be used. For example, the display state estimation part 120 may, first, predict the centers of products in the arrangement region and determine how uneven feature vectors on a feature value map relative to the centers of products are in the arrangement region. Uneven feature vectors of the products are considered to reflect an uneven local appearance and an unaligned orientation of the products. Alternatively, unevenness between multiple (e.g., two) neighboring products may be estimated, followed by totaling in the entirety of the arrangement region. Specifically, the display state estimation part 120 may search "k" neighboring products for each of the products in the arrangement region, and evaluate identity in the orientation between the product of interest and each of the neighboring products based on, for example, an inner product of the feature vectors. Then, the display state estimation part 120 may calculate the identity for pairs of the product of interest and each of the neighboring products in the arrangement region, followed by averaging, thereby determining the alignment degree of products in the arrangement region. Alternatively, using a machine learning model that has been trained to calculate a feature value of an arrangement region, the display state estimation part 120 may use, as the alignment degree of products, the feature value calculated for the arrangement region in the frame.

[Analysis Process]

Figure 7:
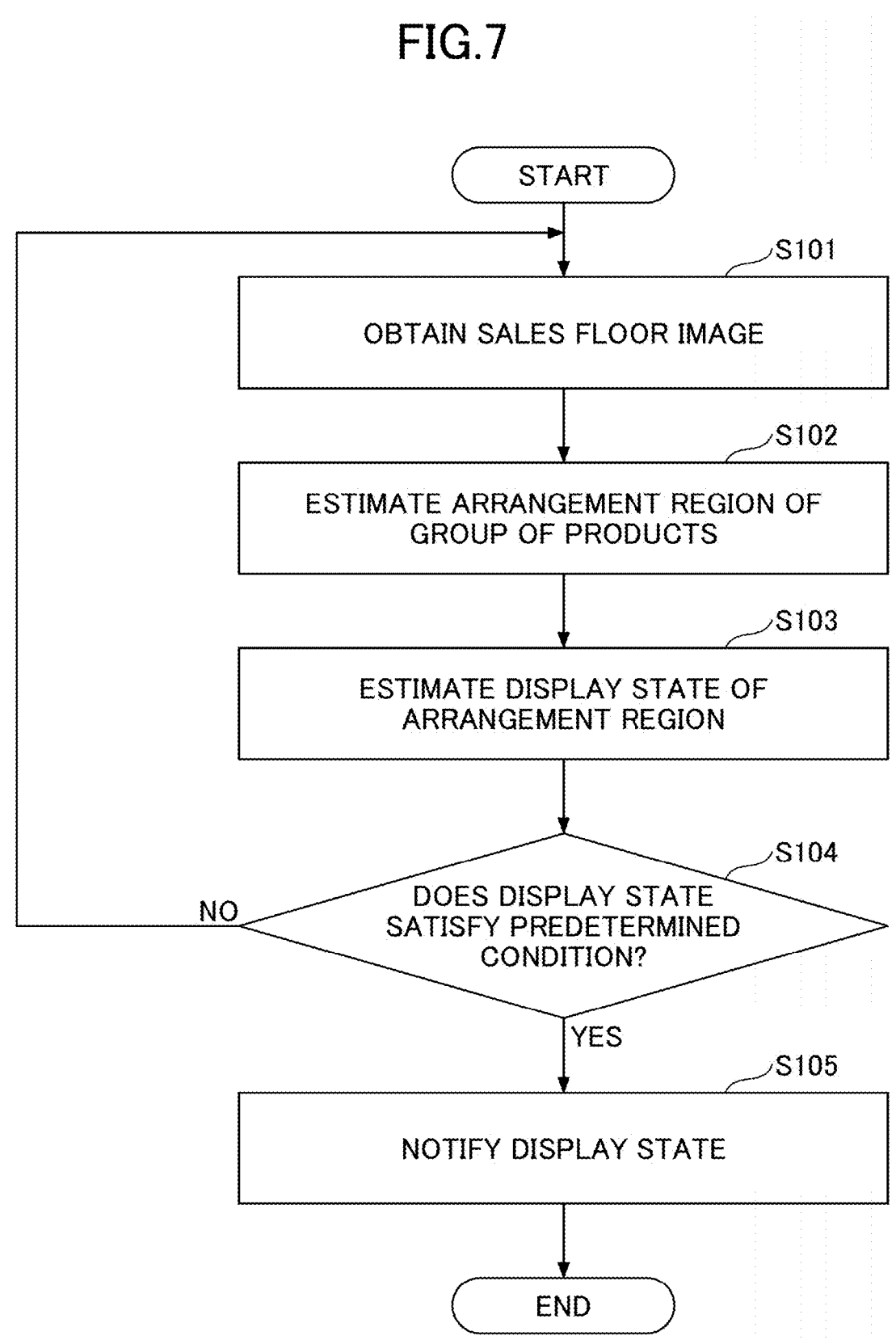
FIG. 7 is a flowchart illustrating the analysis process according to one example of the present disclosure.

Next, referring to FIG. 7, an analysis process according to one example of the present disclosure will be described. The analysis process is executed by the above-described analysis device 100 and, for example, can be realized when one or more processors execute programs stored in one or more memories of the analysis device 100. FIG. 7 is a flowchart illustrating the analysis process according to one example of the present disclosure.

As illustrated in FIG. 7, in step S101, the analysis device 100 obtains a sales floor image. Specifically, the analysis device 100 obtains the sales floor image from the image-taking device 20 that is set in the sales floor. Here, the analysis device 100 may execute subsequent steps in real time for the obtained sales floor image, or may temporarily store the obtained sales floor image and then execute subsequent steps for the stored sales floor image at an appropriate timing. Also, in addition to receiving the sales floor image, the analysis device 100 may obtain data produced by processing the sales floor image (i.e., data based on the sales floor image).

In step S102, the analysis device 100 estimates an arrangement region of a group of products of the same type from the sales floor image. For example, the analysis device 100 may segment a frame of the sales floor image, and estimate an arrangement region of a group of products displayed on the sales floor from the frame of the sales floor image by using a machine learning model, such as a neural network, that is previously trained to estimate an arrangement region for each of the types of products displayed on the sales floor.

In step S103, the analysis device 100 estimates a display state of the group of products in the arrangement region. Specifically, the analysis device 100 estimates one or more of the product name of the group of products, the number of products, and the alignment degree of products displayed on the sales floor from the frame of the sales floor image by using a machine learning model, such as a neural network, that is previously trained, from the frame of the sales floor image, to estimate one or more of the product name of the group of products, the number of products, and the alignment degree of products in the arrangement region for each of the types of products. For example, the analysis device 100 may calculate the number of products based on the number of the centers of the products in the arrangement region and determine the alignment degree of products based on identity in the orientation between the products in the arrangement region by using a machine learning model, such as a neural network, that is trained to estimate the center and/or orientation of each product in the arrangement region segmented from the frame.

In step S104, the analysis device 100 determines whether or not the display state satisfies a predetermined condition. Specifically, the analysis device 100 determines whether or not the display state needs to be dealt with by a store clerk or the like. For example, the analysis device 100 may detect whether or not there is any arrangement region in which the estimated number of products is less than a predetermined value. Alternatively, the analysis device 100 may detect whether or not the estimated alignment degree of products is less than a predetermined value. Alternatively, the analysis device 100 may detect whether or not the area of a product region is less than a set value. When the analysis device 100 has detected an arrangement region that is less than the predetermined value and satisfies the predetermined condition (S104: YES), the analysis device 100 notifies, in step S105, a store clerk or the like via a user terminal or the like to replenish or align the products in the detected arrangement region. Meanwhile, when the analysis device 100 has not detected any arrangement region that satisfies the predetermined condition (S104: NO), the analysis device 100 returns to step S101 and repeats the above-described steps.

Also, the analysis device 100 may store a log in relation to satisfying the predetermined condition, or output the log to an external storage device or the like. The log can be used for the running of business or improvement of business operations of the store. Also, for example, such a log may be stored in association with the sales floor image that has been determined to satisfy the predetermined condition. Thereby, it is possible to readily use the log for the running of business, improvement of business operations, or the like of the store.

[Hardware Configuration]

A part or all of the analysis device 100 according to the above-described embodiment may be configured by hardware, or by information processing of software (program) executed by a CPU (Central Processing Unit), a GPU (Graphics Processing Unit), or the like. When the analysis device 100 is configured by the information processing of the software, the information processing of the software may be executed by storing the software, which realizes at least a part of the functions of the devices included in the above-described embodiment, in a non-transitory storage medium (a non-transitory computer-readable medium, e.g., a flexible disk, a CD-ROM (Compact Disc-Read Only Memory), a USB (Universal Serial Bus) memory, or the like) and by reading the non-transitory storage medium in a computer. Also, the software may be downloaded via a communication network. Further, the information processing may be executed by hardware with the software being mounted in circuits such as an ASIC (Application Specific Integrated Circuit), a FPGA (Field Programmable Gate Array), or the like.

There is no limitation on a type of the storage medium storing the software. The storage medium is not limited to a removable storage medium, such as a magnetic disk, an optical disk, or the like, and may be a fixed storage medium, such as a hard disk, a memory, or the like. Also, the storage medium may be provided internally of the computer, or provided externally to the computer.

Figure 8:
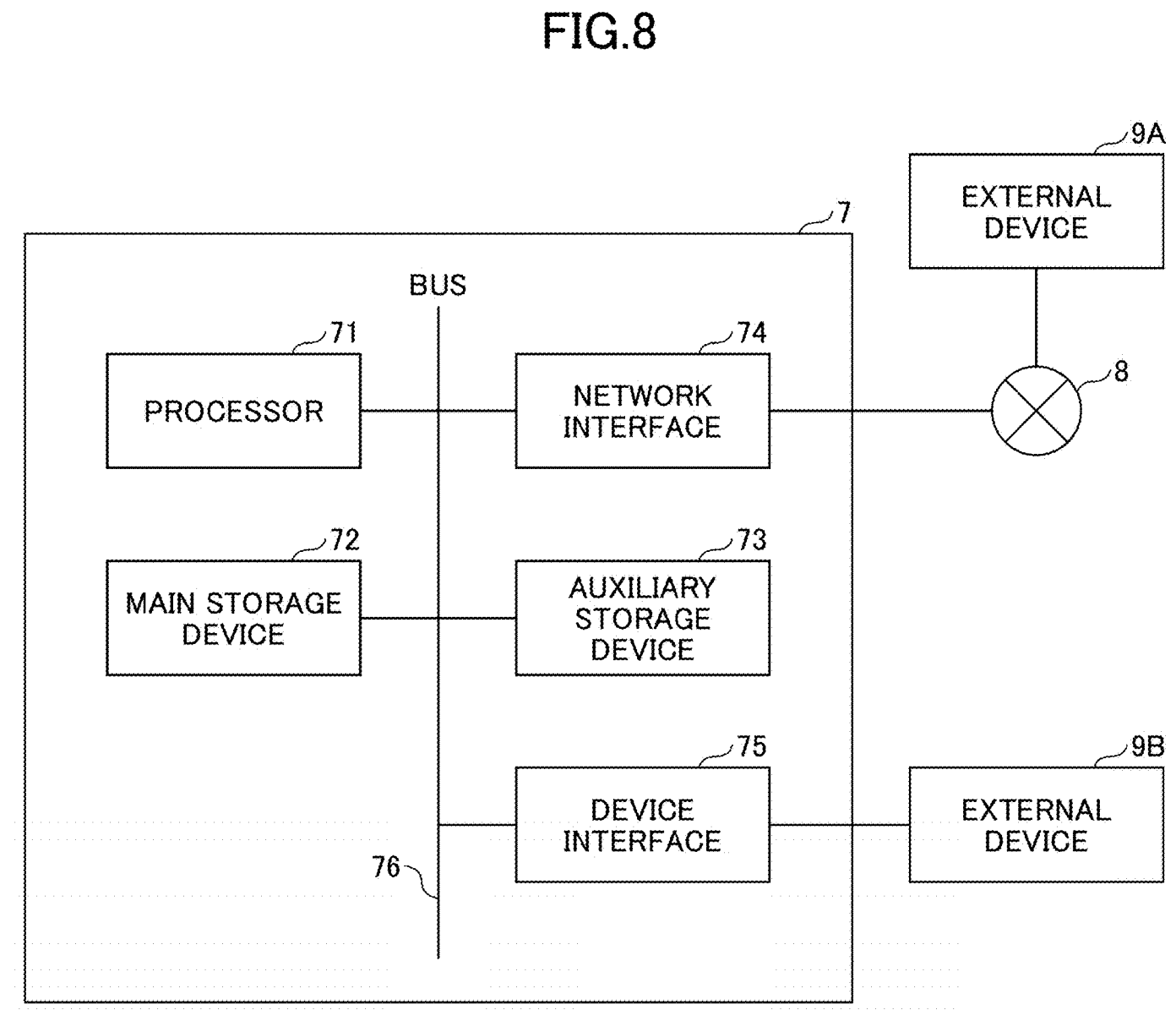

FIG. 8 is a block diagram illustrating a hardware configuration of the analysis device 100 in the above-described embodiment. As one example, the analysis device 100 includes a processor 71, a main storage device 72 (memory), an auxiliary storage device 73 (memory), a network interface 74, and a device interface 75. These are connected to each other via a bus 76 and may be realized as a computer 7.

The computer 7 of FIG. 8 includes one of each of the constituting elements, but may include multiple constituting elements that are the same. Also, FIG. 8 illustrates one computer 7, but the software may be installed in multiple computers, which may each execute the same or different partial processes of the software. In this case, the computers may be in the form of distributed computing in which the computers communicate with each other via the network interface 74 or the like, thereby executing the process. That is, the analysis device 100 in the above-described embodiment may be configured as a system in which one or more computers execute instructions stored in one or more storage devices, thereby realizing the functions. Also, the analysis device 100 in the above-described embodiment may be configured such that information transmitted from a terminal is processed by one or more computers provided on the cloud and the result of the processing is transmitted to the terminal.

Various computations of the analysis device 100 in the above-described embodiment may be executed in parallel using one or more processors or multiple computers connected via a network. Also, various computations may be distributed among multiple computation cores inside the processor, and executed through parallel processing. Also, a part or all of the processing, means, or the like of the present disclosure may be executed by at least one of a processor and a storage device provided on the cloud communicable with the computer 7 via a network. In this way, the analysis device 100 in the above-described embodiment may be in the form of parallel computing by one or more computers.

The processor 71 may be an electronic circuit (e.g., a process circuit, a processing circuit, a processing circuitry, a CPU, a GPU, a FPGA, an ASIC, or the like) including a control device and an arithmetic device of a computer. Also, the processor 71 may be a semiconductor device or the like including a dedicated processing circuit. The processor 71 is not limited to the electronic circuit using electronic logic elements, and may be realized by an optical circuit using optical logic elements. Further, the processor 71 may include computing functions based on quantum computing.

The processor 71 can perform computation processing based on data and software (program) input from the devices provided internally of the computer 7, and output a computation result and a control signal to the devices. The processor 71 may control the constituting elements of the computer 7 by executing an OS (Operating System), an application, or the like of the computer 7.

The analysis device 100 in the above-described embodiment may be realized by one or more processors 71. Here, the processor 71 may refer to one or more electronic circuits disposed on a single chip, or may refer to one or more electronic circuits disposed on two or more chips or on two or more devices. When using two or more electronic circuits, each of the electronic circuits may communicate by wire or wirelessly.

The main storage device 72 is a storage device that stores instructions to be executed by the processor 71, various data, and the like, and the information stored in the main storage device 72 is read out by the processor 71. The auxiliary storage device 73 is a storage device other than the main storage device 72. These storage devices refer to given electronic components capable of storing electronic information, and may be semiconductor memories. The semiconductor memory may be either one of a volatile memory and a non-volatile memory. The storage device for storing the various data in the analysis device 100 in the above-described embodiment may be realized by the main storage device 72 or the auxiliary storage device 73, or may be realized by an internal memory provided internally of the processor 71. For example, the storage device 72 in the above-described embodiment may be realized by the main storage device 72 or the auxiliary storage device 73.

Multiple processors or a single processor may be connected (coupled) to a single storage device (memory). Multiple storage devices (memories) may be connected (coupled) to a single processor. When the analysis device 100 in the above-described embodiment is configured with at least one storage device (memory) and multiple processors connected (coupled) to the at least one storage device (memory), at least one processor of the multiple processors may be connected (coupled) to the at least one storage device (memory). Also, such a configuration may be realized by a storage device (memory) and a processor included in multiple computers. Further, the configuration may include the storage device (memory) integrated with the processor (e.g., a cache memory including a L1 cache, a L2 cache, or the like).

The network interface 74 is an interface for connecting to a communication network 8, by wire or wirelessly. The network interface 74 may use an appropriate interface such as an interface conforming to existing communication standards. Exchange of information with an external device 9A connected via the communication network 8 may be performed via the network interface 74. Note that, the communication network 8 may be a WAN (Wide Area Network), a LAN (Local Area Network), a PAN (Personal Area Network), or the like, or may be a combination thereof, as long as exchange of information is performed between the computer 7 and the external device 9A. Examples of the WAN include the Internet and the like. Examples of the LAN include the IEEE 802.11, ETHERNET (registered trademark), and the like. Examples of the PAN include Bluetooth (registered trademark), NFC (Near Field Communication), and the like.

The device interface 75 may be an interface such as a USB or the like that directly connects to an external device 9B.

The external device 9A is a device that is connected to the computer 7 via a network. The external device 9B is a device that is directly connected to the computer 7.

The external device 9A or the external device 9B may be an input device, as one example. The input device may be a device such as a camera, a microphone, a motion capture device, various sensors, a keyboard, a mouse, a touch panel, or the like, and provides obtained information to the computer 7. Also, the external device 9A or the external device

9B may be a device including an input part, a memory, and a processor, such as a personal computer, a tablet terminal, a smartphone, or the like.

Also, the external device 9A or the external device 9B may be an output device, as one example. The output device may be a display device, such as a LCD (Liquid Crystal Display), a CRT (Cathode Ray Tube), a PDP (Plasma Display Panel), an organic EL (Electro Luminescence) panel, or the like, or may be a speaker or the like that outputs voice or the like. Also, the external device 9A or the external device 9B may be a device including an output part, a memory, and a processor, such as a personal computer, a tablet terminal, a smartphone, or the like.

Also, the external device 9A or the external device 9B may be a storage device (memory). For example, the external device 9A may be a network storage or the like, and the external device 9B may be a storage such as a HDD.

Also, the external device 9A or the external device 9B may be a device having the functions of a part of the constituting elements of the device in the above-described embodiment (a server 100 or a terminal 200). That is, the computer 7 may transmit or receive a part or all of the processing results of the external device 9A or the external device 9B.

In the present specification (including the claims), if the expression "at least one of a, b, and c" or "at least one of a, b, or c" is used (including similar expressions), any one of a, b, c, a-b, a-c, b-c, and a-b-c is included. Multiple instances may also be included in any of the elements, such as a-a, a-b-b, and a-a-b-b-c-c. Further, the addition of another element other than the listed elements (a, b, and c), such as adding d as a-b-c-d, is included.

In the present specification (including the claims), if the expression such as "data as an input", "based on data", "according to data", or "in accordance with data" (including similar expressions) is used, unless otherwise indicated, a case where various data itself is used as an input and a case where data obtained by processing various data (for example, data obtained by adding noise, normalized data, and intermediate representation of various data) is used as an input are included. If it is described that any result can be obtained "based on data", "according to data", or "in accordance with data", a case where the result is obtained based on only the data is included, and a case where the result is obtained affected by another data other than the data, factors, conditions, and/or states may be included. If it is described that "data is output", unless otherwise indicated, a case where various data is used as an output and a case where data processed in some way (for example, data obtained by adding noise, normalized data, and intermediate representation of various data) is used as an output are included.

In the present specification (including the claims), if the tams "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case where a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (instruction). If the element A is a dedicated processor or a dedicated arithmetic circuit, a circuit structure of the processor may be implemented so as to actually perform the operation B irrespective of whether or not the control instruction and the data are actually attached.

In the present specification (including the claims), if a term indicating containing or possessing (for example, "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number is used in another description (an expression using "a" or "an" as an article), it is not intended that the latter expression indicates "one". Generally, an expression that does not specify a quantity or that suggests a singular number (that is, an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, states, and/or the like are satisfied, and is not necessarily obtained in the claimed invention that defines the configuration or a similar configuration.

In the present specification (including the claims), if a term such as "maximize" is used, it should be interpreted as appropriate according to a context in which the term is used, including obtaining a global maximum value, obtaining an approximate global maximum value, obtaining a local maximum value, and obtaining an approximate local maximum value. It also includes determining approximate values of these maximum values, stochastically or heuristically. Similarly, if a term such as "minimize" is used, they should be interpreted as appropriate, according to a context in which the term is used, including obtaining a global minimum value, obtaining an approximate global minimum value, obtaining a local minimum value, and obtaining an approximate local minimum value. It also includes determining approximate values of these minimum values, stochastically or heuristically. Similarly, if a team such as "optimize" is used, the term should be interpreted as appropriate according to a context in which the team is used, including obtaining a global optimum value, obtaining an approximate global optimum value, obtaining a local optimum value, and obtaining an approximate local optimum value. It also includes determining approximate values of these optimum values, stochastically or heuristically.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while another hardware may perform the remainder of the predetermined processes. In the present specification (including the claims), if an expression such as "one or more hardware performs a first process and the one or more hardware perform a second process" is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices (memories) may store only a portion of the data or may store an entirety of the data.

Although the embodiments of the present disclosure have been described above in detail, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in all of the embodiments described above, if numerical values or mathematical expressions are used for description, they are presented as an example and are not limited thereto. Additionally, the order of respective operations in the embodiment is presented as an example and is not limited thereto.

The invention claimed is:

1. An analysis device, comprising:
one or more memories; and
one or more processors, wherein
the one or more processors are configured to:
estimate an arrangement region of a group of products having a same product name within a sales floor image, based on the sales floor image;
generate data to display boundary information indicating the estimated arrangement region of the group of products; and
notify a user terminal of information on a display state of the group of products in the arrangement region estimated, to display the arrangement region and the product name on the user terminal in a manner that visually associates the arrangement region with the product name by displaying, at the user terminal, the boundary information indicating the estimated arrangement region in visual association with the displayed product name, the information on the display state including both the product name of the group of products in the arrangement region and the generated data to display the boundary information indicating the estimated arrangement region.

2. The analysis device according to claim 1, wherein the sales floor image is a sales floor image including displayed products of multiple types, and the one or more processors estimate the arrangement region for each of the types based on the sales floor image including the products of multiple types.

3. The analysis device according to claim 1, wherein the one or more processors estimate, based on the arrangement region estimated, the display state in the arrangement region, and notify the information on the display state estimated.

4. The analysis device according to claim 1, wherein the one or more processors perform the estimation using a first trained machine learning model.

5. The analysis device according to claim 4, wherein the first trained machine learning model outputs, in response to input of the sales floor image including displayed products of multiple types, data indicating multiple arrangement regions respectively corresponding to the products of multiple types.

6. The analysis device according to claim 4, wherein the first trained machine learning model is a machine learning model that is trained through supervised learning using training data including the sales floor image and an annotation in relation to information of the arrangement region of the group of products.

7. The analysis device according to claim 1, wherein an image showing the arrangement region estimated is superimposed on the sales floor image.

8. The analysis device according to claim 1, wherein the user terminal is a terminal used in a store in which the sales floor image is taken.

9. The analysis device according to claim 1, wherein the information includes information indicating the arrangement region estimated.

10. The analysis device according to claim 1, wherein the sales floor image is a sales floor image from which a moving object is removed.

11. The analysis device according to claim 1, wherein the arrangement region of the group of products is a region where same products are disposed together.

12. The analysis device according to claim 1, wherein the one or more processors use a second trained machine learning model, and estimate either or both of a point and an orientation in a region of the products in the arrangement region estimated and estimate either or both of a number of products and an alignment degree of products of the group of products based on either or both of the point and the orientation estimated.

13. The analysis device according to claim 1, wherein in response to the display state satisfying a predetermined condition, the one or more processors notify the information on the display state, the information on the display state including information indicative of the estimated arrangement region.

14. The analysis device according to claim 1, wherein in response to determining that the estimated arrangement region has a small number of products, the one or more processors notify the estimated arrangement region of the group of products, the product name of the group of products, and a content of work for the arrangement region.

15. An analysis system, comprising:
the analysis device according to claim 1; and
an image-taking device configured to take the sales floor image.

16. An analysis method performed by one or more processors, the analysis method comprising:
estimating an arrangement region of a group of products having a same product name within a sales floor image, based on the sales floor image;
generating data to display boundary information indicating the estimated arrangement region of the group of products; and notifying a user terminal of information on a display state of the group of products in the arrangement region estimated, to display the arrangement region and the product name on the user terminal in a manner that visually associates the arrangement region with the product name by displaying, at the user terminal, the boundary information indicating the estimated arrangement region in visual association with the displayed product name, the information on the display state including both the product name of the group of products in the arrangement region and the generated data to display the boundary information indicating the estimated arrangement region.

17. A computer-readable medium that is non-transitory and stores a program that causes one or more processors to execute a process including:
estimating an arrangement region of a group of products having a same product name within a sales floor image, based on the sales floor image;
generating data to display boundary information indicating the estimated arrangement region of the group of products; and
notifying a user terminal of information on a display state of the group of products in the arrangement region estimated, to display the arrangement region and the product name on the user terminal in a manner that visually associates the arrangement region with the product name by displaying, at the user terminal, the boundary information indicating the estimated arrangement region in visual association with the displayed product name, the information on the display state including both the product name of the group of products in the arrangement region and the generated data to display the boundary information indicating the estimated arrangement region.

18. The analysis device according to claim 1, wherein the product name included in the notified information is information that uniquely identifies an individual product.

19. The analysis device according to claim 1, wherein the product name included in the notified display state is indicated by product identification information previously allocated to the product name.

20. The analysis device according to claim 19, wherein the product identification information is a product number previously allocated to the product name.

21. The analysis device according to claim 1, wherein the one or more processors are configured to associate the boundary information indicating the estimated arrangement region with the product name of the group of products in the estimated arrangement region, and generate the information including the boundary information indicating the estimated arrangement region associated with the product name.

22. The analysis device according to claim 1, wherein displaying the boundary information indicating the estimated arrangement region displays the boundary information adjacent to a display relating to the product name of the group of products in the estimated arrangement region.

23. The analysis device according to claim 1, wherein
the boundary information indicating the arrangement region is displayed on the user terminal in a manner that indicates a position of the group of products in a display shelf, and
the product name is displayed on the user terminal in a manner that visually indicates a correspondence between the boundary information indicating the arrangement region being displayed on the user terminal and the product name.

24. The analysis device according to claim 1, wherein the boundary information indicating the arrangement region is visually associated with the product name by displaying a mapping between the boundary information indicating the arrangement region and the product name.

25. The analysis device according to claim 24, wherein the mapping is indicated by displaying the product name adjacent to the boundary information indicating the arrangement region.

26. The analysis device according to claim 1, wherein the one or more processors are configured to estimate arrangement regions of groups of products and generate the data to display each boundary information indicating a corresponding one of the estimated arrangement regions, each group of products having a same product name, within the sales floor image, based on the sales floor image, and the estimated arrangement regions and respective product names of the groups of products are displayed in a manner that visually associates the boundary information indicating the corresponding one of the estimated arrangement regions with a corresponding one of the product names based on the generated data.

27. The analysis device according to claim 1, wherein the one or more processors are configured to associate the arrangement region with each of the product name and at least two different types of information related to products having the product name, and the arrangement region and the at least two different types of information are displayed in a manner that visually associates the boundary information indicating the arrangement region with each of the at least two different types of information.

28. The analysis device according to claim 27, wherein one of the at least two types of information relates to an amount of the products having the product name and another one of the at least two types of information relates to a position of the products having the product name.

29. The analysis device according to claim 1, wherein the sales floor image is taken by an image-taking device attached to a movable device moving around a sales floor.

30. The analysis device according to claim 1, wherein the one or more processors are configured to store log data related to the display state of the group of products in the arrangement region in association with the sales floor image.

31. The analysis device according to claim 1, wherein the boundary information displayed in the visual association with the product name is a boundary line enclosing the estimated arrangement region of the group of products having the product name.

\* \* \* \* \*